N. BONIFACE.
PUMP.
APPLICATION FILED NOV. 22, 1919.
1,437,338.
Patented Nov. 28, 1922.
2 SHEETS—SHEET 1.
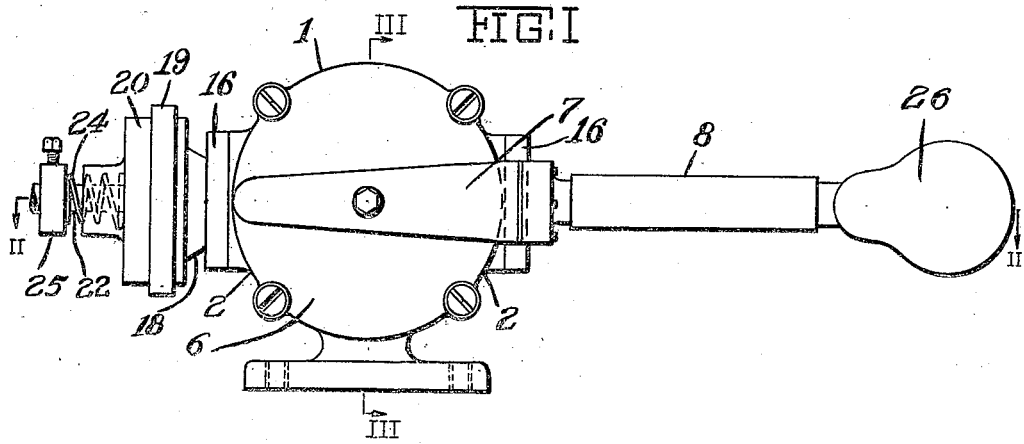
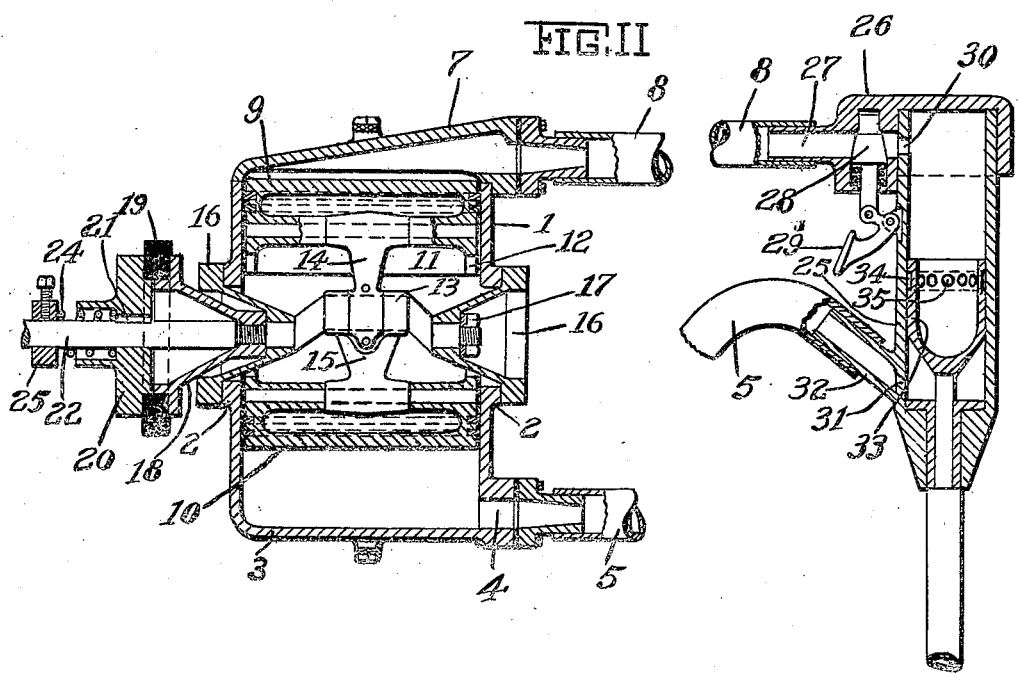
Inventor
Nicholas Boniface
By [signature]
Attorney

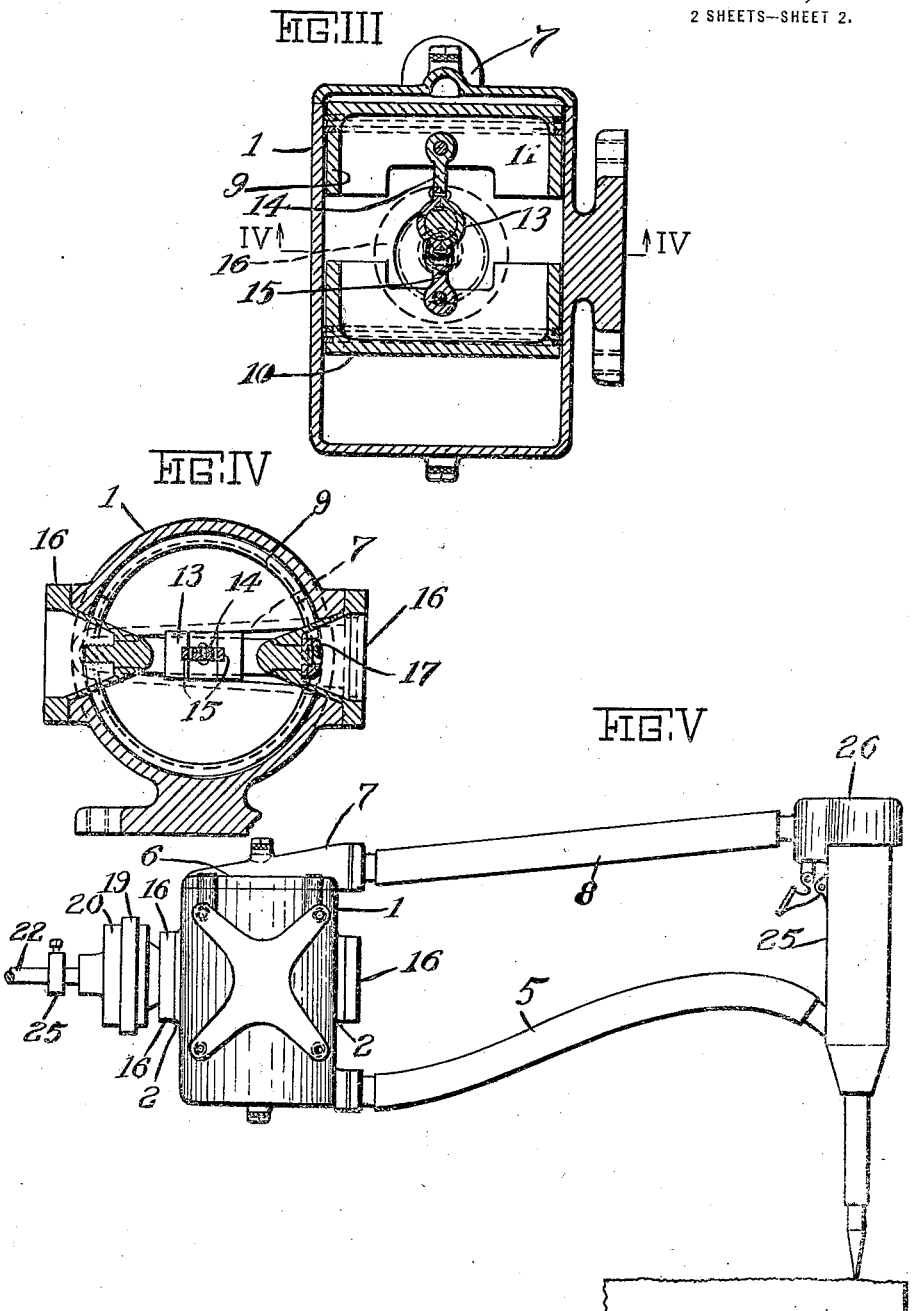

Patented Nov. 28, 1922.

1,437,338

UNITED STATES PATENT OFFICE.

NICHOLAS BONIFACE, OF BEVERLY, MASSACHUSETTS.

PUMP.

Application filed November 22, 1919. Serial No. 339,809.

*To all whom it may concern:*

Be it known that I, NICHOLAS BONIFACE, a citizen of the United States, residing at Beverly, county of Essex, Commonwealth of Massachusetts, have invented certain new and useful Improvements in Pumps, of which the following is a specification.

This invention relates to pneumatic tool operation and particularly to air compression for stone working tools and the like.

For many purposes a light and portable source of air supply is of prime importance. In most instances where sculpturing is to be done and in many instances where stone is worked in quarry or shed, a convenient portable source of supply is greatly desired.

In discussing my present invention, I shall for the purposes of illustration treat it more particularly from the view point of lighter types of work, altho it will be understood that even for heavier work the same principles apply even if the degree of convenience and portability be reduced.

In many instances the compressed air tank usually used in quarries and sheds is out of the question. Storage of a sufficient amount of air and the piping of it for considerable distances can not be practiced in many places where work could be most conveniently performed. It is the object of my invention therefore to provide an equipment capable of a high degree of portability, simple, compact and easily operated, and at the same time highly efficient. Throughout the specification and drawings like reference characters are correspondingly employed to indicate corresponding parts. In the drawings I have shown a characteristic form well adapted to a variety of uses.

Fig. I is a side view of an outfit in accordance with my invention.

Fig. II a sectional view on the line II—II of Fig. 1 of a compressor and tool thereof.

Fig. III a section on the line III—III of Fig. 1.

Fig. IV a central section on the line IV—IV of Fig. 3, with the base broken away, and Fig. V a plan view of the outfit.

In accordance with my invention I provide a compressor consisting of a tubular casing 1 having centrally thereof a transverse opening surrounded by suitable bosses 2. The casing 1 is closed at one end as indicated at 3, this end being formed with an air port 4 to which may be attached any suitable coupling pipe 5.

At the opposite end the casing is formed open and capped by a head 6 having a port 7 to which may be attached any suitable coupling connection 8. Within the cylindrical casing 1 are formed two opposite cylinders in which are pistons 9 and 10. These pistons are formed with depending walls 11 which are slightly cut out at 12 to clear the bearings 16 of the crank shaft 13. The piston 9 has a connecting rod 14 and the piston 10 a connecting rod 15 which is split and straddles the rod 14 on the wrist pin of the shaft.

The shaft 14 is given bearing in a pair of conical members 16 which are entered within the bosses 2 and suitably attached to such bosses. In this manner I am able to assemble the pistons 9 and 10 to the crank shaft 13 and enter the assembly through the open end of the casing 1. The ends of the crank shaft 13 are then picked up in the bearings at the truncated ends of the conical members 16.

These ends are secured in one instance by a nut 17 and in the other instance by a second threaded member 18 provided with a fibre disc 19 and forming one member of a friction drive. The other member of this friction drive is preferably a disc 20 keyed at 21 to a shaft 22. This is preferably an extension motor shaft 22. On the shaft 22 is set block 23 backing a spring 24 which holds the block 23 against the fibre disc 19. The ends of the shaft 13 are shouldered slightly outside the inner walls of the bearing member 16 so that the members threaded thereon are clear of such walls.

The connections 5 and 8 lead to the tool which comprises a cylindrical body 25 capped at 26. The port 27 through this cap is controlled by a valve 28 operated by a finger lever 29. The port 27 alines with a port 30 in the shell 25. At the opposite end the shell 25 is pierced by a port 31 which carries a tubular extension 32 on which the pipe 5 is set.

Within the cylindrical shell 25 is a cup shaped hammer 33. Adjacent the upper end of this hammer is an annular groove 34 the shell of the cup being perforated at 35. When the cup is forced in its extreme upward position the groove 34 alines with the port 30 permitting the air to gain access to the interior of the cup and so drive it down on its stroke of impact.

As the compressor is run the pistons alternately compress and exhaust in their respective cylinders. This alternately forces air through the pipes 5 and 8 to the tool 25. On each return stroke the air is forced back at the opposite side of the head 33 so that as the compressor is run the hammer 33 of the tool is rapidly forced back and forth giving it its working stroke of impact and recovery therefrom.

What I therefore claim and desire to secure by Letters Patent is:

1. A device of the class described, comprising a cylindrical casing having a cylinder portion at each end thereof, a centrally disposed crank shaft intermediate of said cylinder portions, inwardly disposed conical bearing members supporting said crank shaft, a piston for each of said cylinders, connecting rods disposed between said crank shaft and said cylinders, said casing having an air opening at each end thereof.

2. A device of the class described, comprising a cylindrical casing having a cylinder portion at each end thereof, alined crank bearing openings intermediate the same, a centrally disposed conical bearing member disposed in said openings and supporting said crank shaft, a piston for each of said cylinders, connecting rods disposed between said crank shaft and said cylinders, said casing having an air opening at each end thereof.

In testimony whereof I affix my signature in presence of two witnesses.

NICHOLAS BONIFACE.

Witnesses:
 PETER L. BONIFACE,
 ABRAHAM GLOVSKY.